No. 813,114. PATENTED FEB. 20, 1906.
P. PREUSS.
DEVICE FOR CUTTING SCREWS UPON LONG RODS.
APPLICATION FILED MAR. 10, 1905.
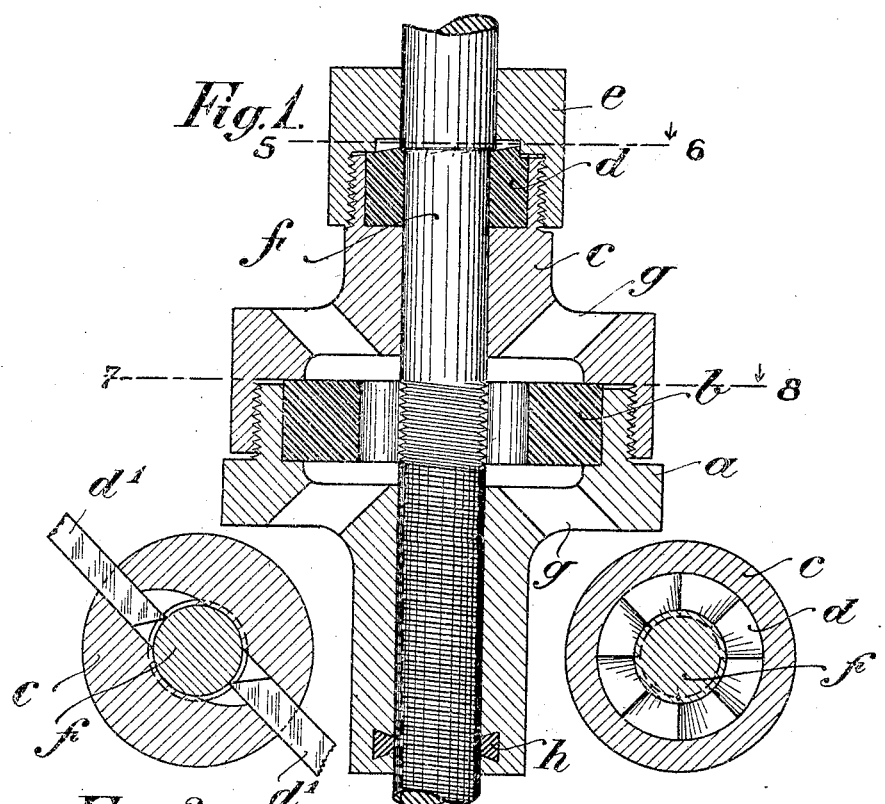
Fig.1.
Fig.3.  Fig.2.
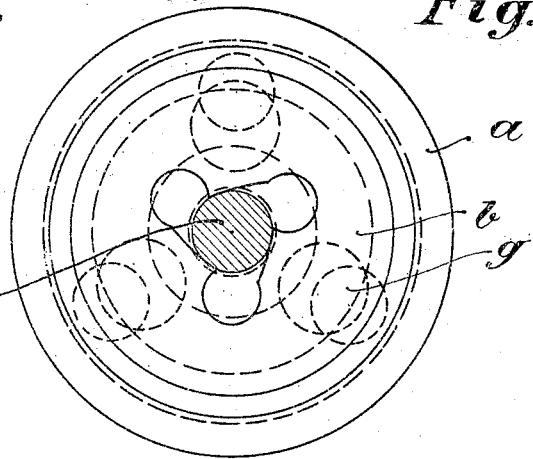
Fig.4.
Witnesses:
Arthur Thiergart
Max Rensch
Inventor:
Paul Preuss
By F.A. Hoppon
Attorney.

UNITED STATES PATENT OFFICE.

PAUL PREUSS, OF BERLIN, GERMANY.

DEVICE FOR CUTTING SCREWS UPON LONG RODS.

No. 813,114.

Specification of Letters Patent.

Patented Feb. 20, 1906.

Application filed March 10, 1905. Serial No. 249,481.

*To all whom it may concern:*

Be it known that I, PAUL PREUSS, a subject of the King of Prussia, German Emperor, residing at No. 69 Wrangel street, in the city of Berlin, in the Kingdom of Prussia, German Empire, have invented a new and Improved Device for Cutting Screws upon Long Rods, of which the following is a specification.

To cut screws upon long rods and the like, thread-cutting lathes, as well as screw-plates, have been employed since a long time, particularly where the thread although tolerably useful was more of a cheap than of an exact nature. In both these cases, however, the rods became deformed by the unequal pressing during the cutting and by the mechanical influence upon the outer fibers of the material, and thus the rods had to be re-straightened after the cutting, which was pretty much laborious, particularly where threads of precise make were required. These drawbacks are done away with by my improved cutting-tool, as represented in the accompanying drawings, in which—

Figure 1 is a longitudinal section through said device. Fig. 2 is a cross-section in line 5 6 of Fig. 1. Fig. 3 is a cross-section similar to Fig. 2, showing a slightly-modified form of construction; and Fig. 4 a cross-section in line 7 8 of Fig. 1.

The sleeve *a* consists of a tube-like portion adapted to be fixed to the chuck of a suitable lathe and of a widened portion adapted to receive the cutting-tool proper, *b*. The bore of the narrow portion of this rotary sleeve corresponds to the outer diameter of the thread to be cut, and the bore of another sleeve *c*, adapted to be screwed upon the sleeve *a*, corresponds to the outer diameter of the stationary rod to be threaded, *f*, so that the rod *f* is guided as well as kept straight by the narrow portions of the sleeves and their bores. The sleeve *c* is provided with a nut *e*, taking around the rod *f*, and between the parts *c* and *e* is located a rose-bit *d*, Figs. 1 and 2, (or are arranged knives *d'*, Fig. 3,) which smoothes the surface of the rod and makes it fit to receive the thread. The rough bar is pressed against the rose-bit just by the action of the tool *b* upon the thread it has cut, so that a special feeding device can be dispensed with.

Apertures *g* allow of the chips leaving the casing formed by the widened portions of the sleeves *a* and *c*, and scrapers *h* remove the chips carried away by the threads.

Having now described my invention, what I desire to secure by a patent of the United States is—

1. In a device for cutting screws upon long rods, the combination with a sleeve *a* having a narrow portion adapted to be fixed to the rotary chuck of a suitable lathe, and a widened portion adapted to receive the threading-tool, another sleeve attached to said widened portion, and having also a narrow portion, a bore in each of the two narrow portions adapted to receive, to guide, and to keep straight the rod to be threaded, and threading-tools located within the space inclosed by the two widened portions of the sleeves, and secured to the first-mentioned sleeve, substantially and for the purpose as described.

2. In a device for cutting screws upon long rods, the combination with a sleeve *a* having a narrow portion adapted to be fixed to the rotary chuck of a suitable lathe and a widened portion adapted to receive the threading-tool, another sleeve attached to said widened portion, and having also a narrow portion, a bore in each of the two narrow portions adapted to receive, to guide, and to keep straight the rod to be threaded, threading-tools located within the space inclosed by the two widened portions of the sleeves, and secured to the first-mentioned sleeve, a rod-smoothing tool secured to the narrow portion of the other sleeve, and a nut attached to the latter and adapted to hold this tool in place, substantially and for the purpose as described.

3. In a device for cutting screws upon long rods, the combination with a sleeve *a* having a narrow portion adapted to be fixed to the rotary chuck of a suitable lathe, and a widened portion adapted to receive the threading-tool, another sleeve attached to said widened portion, and having also a narrow portion, a bore in each of the two narrow portions adapted to receive, to guide, and to keep straight the rod to be threaded, threading-tools located within the space inclosed by the two widened portions of the sleeves, and secured to the first-mentioned sleeve, and scrapers secured to the outer end of the bore of the latter, substantially and for the purpose as described.

4. In a device for cutting screws upon long rods, the combination with a sleeve *a* having a narrow portion adapted to be fixed to the rotary chuck of a suitable lathe, and a widened portion adapted to receive the threading-tool, another sleeve attached to said widened portion, and having also a narrow portion, a bore in each of the two narrow portions adapted to receive, to guide, and to keep straight the rod to be threaded, threading-tools located within the space inclosed by the two widened portions of the sleeves, and secured to the first-mentioned sleeve, a rod-smoothing tool secured to the narrow portion of the other sleeve, a nut attached to the latter, and adapted to hold this tool in place, and scrapers secured to the outer end of the first sleeve, substantially and for the purpose as described.

In witness whereof I have hereunto set my hand in presence of two witnesses.

PAUL PREUSS.

Witnesses:
    HENRY HASPER,
    WOLDEMAR HAUPT.